United States Patent [19]

Harben et al.

[11] Patent Number: 5,420,380
[45] Date of Patent: May 30, 1995

[54] SEISMIC SWITCH FOR STRONG MOTION MEASUREMENT

[75] Inventors: Philip E. Harben, Oakley; Peter W. Rodgers, Santa Barbara; Daniel W. Ewert, Patterson, all of Calif.

[73] Assignee: The United States of America as represented by the United States Department of Energy, Washington, D.C.

[21] Appl. No.: 15,110

[22] Filed: Feb. 9, 1993

[51] Int. Cl.$^6$ .......................... G01V 1/24; G08B 21/00
[52] U.S. Cl. ..................................... 181/122; 367/178; 340/690
[58] Field of Search ................ 181/122, 401; 367/178, 367/14; 73/649; 340/690

[56] References Cited

U.S. PATENT DOCUMENTS

| | | | |
|---|---|---|---|
| 3,506,957 | 4/1970 | Davison | 340/690 |
| 3,559,050 | 1/1971 | Mifsud | 324/207.18 |
| 4,121,200 | 10/1978 | Colmenero | 340/539 |
| 4,300,135 | 11/1981 | Korn et al. | 340/690 |
| 4,415,979 | 11/1983 | Hernandez | 364/508 |
| 4,468,763 | 8/1984 | Braunling et al. | 367/136 |
| 4,616,320 | 10/1986 | Kerr et al. | 364/421 |
| 4,628,493 | 12/1986 | Nelson et al. | 367/79 |
| 4,649,524 | 3/1987 | Vance | 367/13 |
| 5,001,466 | 3/1991 | Orlinsky et al. | 340/690 |
| 5,003,517 | 3/1991 | Greer, Jr. | 181/122 |
| 5,007,032 | 4/1991 | Jensen | 367/136 |
| 5,101,195 | 3/1992 | Caillat et al. | 340/690 |
| 5,144,598 | 9/1992 | Engdahl et al. | 181/122 |

FOREIGN PATENT DOCUMENTS 104376 8/1979 Japan.
2156563 10/1985 United Kingdom.

Primary Examiner—Ian J. Lobo
Attorney, Agent, or Firm—John Wooldridge; Miguel A. Valdes; William R. Moser

[57] ABSTRACT

A seismic switching device that has an input signal from an existing microseismic station seismometer and a signal from a strong motion measuring instrument. The seismic switch monitors the signal level of the strong motion instrument and passes the seismometer signal to the station data telemetry and recording systems. When the strong motion instrument signal level exceeds a user set threshold level, the seismometer signal is switched out and the strong motion signal is passed to the telemetry system. The amount of time the strong motion signal is passed before switching back to the seismometer signal is user controlled between 1 and 15 seconds. If the threshold level is exceeded during a switch time period, the length of time is extended from that instant by one user set time period.

14 Claims, 6 Drawing Sheets

SEISMIC SWITCH FOR STRONG MOTION MEASUREMENT

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to an earthquake alert system that uses a distributed network of strong motion measurement stations to warn an area prior to a large earthquake. More specifically, it relates to a device that rapidly switches out the sensitive seismometer of an earthquake alert system and switches in a strong motion instrument to provide accurate recording of the strong motion signal.

2. Description of Related Art

Implementation of an earthquake alert system that uses a distributed network of strong motion measurement stations to warn an area before strong motion occurs due to a large earthquake is not cost-effective based on the existing art. Such a system would be cost-effective if existing microseismic stations could be modified to provide strong motion data on the same communication lines. A rapid switching device that switches out the sensitive seismometer as it saturates from large ground motions and switches in a strong motion instrument to provide accurate recording of the strong motion signal would allow such a modification to work. The present invention provides such a device.

SUMMARY OF THE INVENTION

It is an object of the present invention to provide a method and apparatus for simultaneously switching out the signal from an existing microseismic station seismometer and switching in the signal from a strong ground motion measuring instrument.

The present invention discloses a seismic switching device that has an input signal from an existing microseismic station seismometer and a signal from a strong motion measuring instrument. The seismic switch monitors the signal level of the strong motion instrument and passes the seismometer signal to the station data telemetry and recording systems. When the strong motion instrument signal level exceeds a user set threshold level, the seismometer signal is switched out and the strong motion signal is passed to the telemetry system. The amount of time the strong motion signal is passed before switching back to the seismometer signal is user controlled between 1 and 15 seconds. If the threshold level is exceeded during a switch time period, the length of time is extended from that instant by one user set time period.

DETAILED DESCRIPTION OF THE INVENTION

Figure 1:
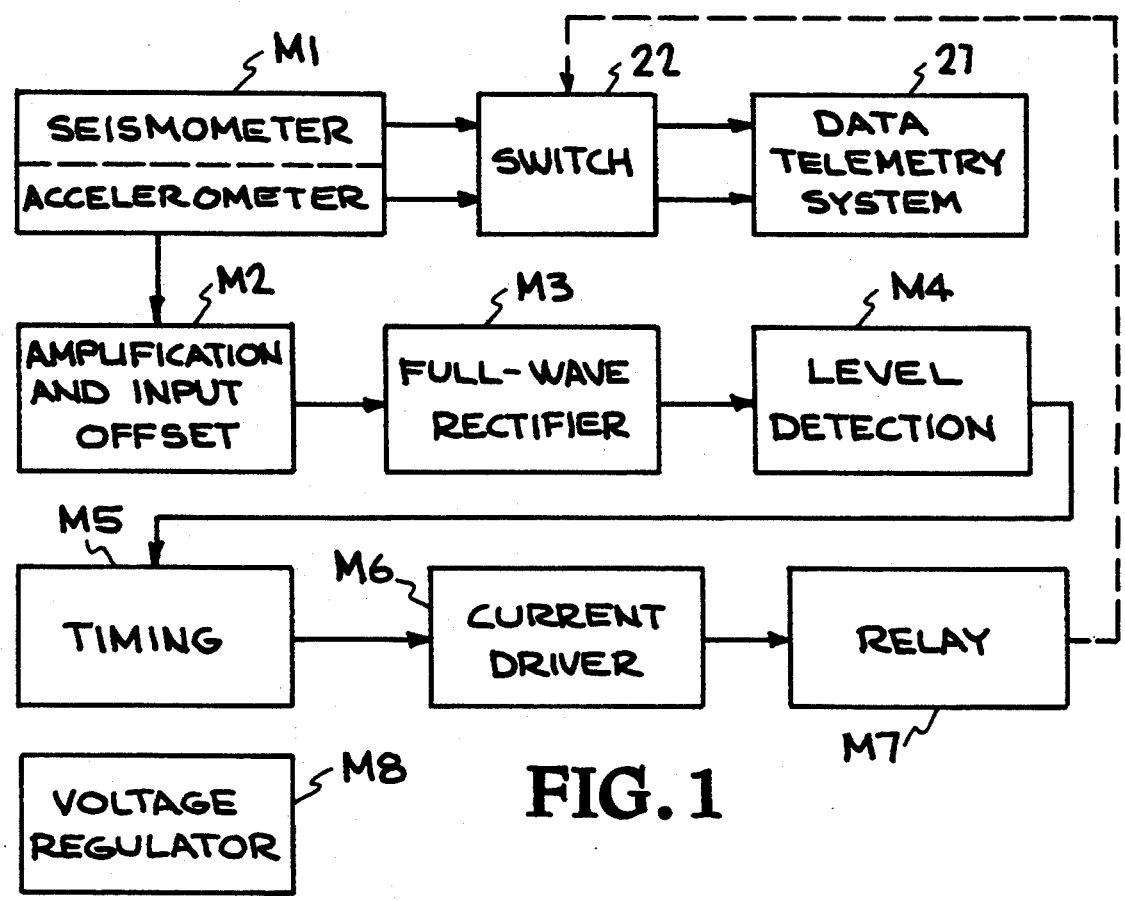
FIG. 1 illustrates a block diagram of the preferred embodiment of the invention.

The present invention, as shown in FIG. 1, is a seismic switching device with two inputs. One input is the signal from a high gain seismometer of an existing microseismic station, and the other is the signal from a strong motion accelerometer. A high gain seismometer is a sensitive device which measures ground motion generally having magnitudes less than 2 on the Richter scale. The preferred embodiment of the seismic switch consists of an apparatus for upgrading an existing microseismic station to allow measurement of ground motion that is greater than 2 on the Richter scale. This embodiment is a system which can be connected between a seismometer and a data telemetry system of the existing microseismic station. A ground motion accelerometer is connected to an input channel of a switch that is connected between the seismometer and the data telemetry system. Another input channel of the switch is connected to the seismometer of the existing microseismic station. An output channel of the switch is connected to a data telemetry system of the existing microseismic station. This channel is normally connected through the switch to the seismometer output channel. A circuit monitors the accelerometer signal and connects the accelerometer signal to the data telemetry system through the switch such that the data telemetry system will record the accelerometer signal for a selectable period of time when the accelerometer signal exceeds a preset value. This configuration is comprised of interconnecting modules Module 1 (M1) through Module 8 (M8), described in detail below.

Module 1 (M1) comprises a strong motion accelerometer and a conventional weak motion seismometer. The signal from the seismometer is normally passed through a switch to a seismic station telemetry and recording system. Module 2 (M2) monitors the accelerometer signal of M1 and provides amplification and input offset adjustment to this monitored accelerometer signal. Module 3 (M3) rectifies any AC signal from M2. This rectified signal is coupled to Module 4 (M4) which is a level detection portion of the circuit. When the signal level from the accelerometer exceeds a user set threshold, then the signal from the seismometer is switched out and the signal from the accelerometer is passed to the telemetry system. Module 5 (M5) determines how long switch 22 remains in the accelerometer position, and Module 6 (M6) provides the current drive needed to energize a relay of Module 7 (M7). Module 8 (M8) is a voltage regulator which provides 5 volts DC to several circuits within the seismic switch.

Figure 2:
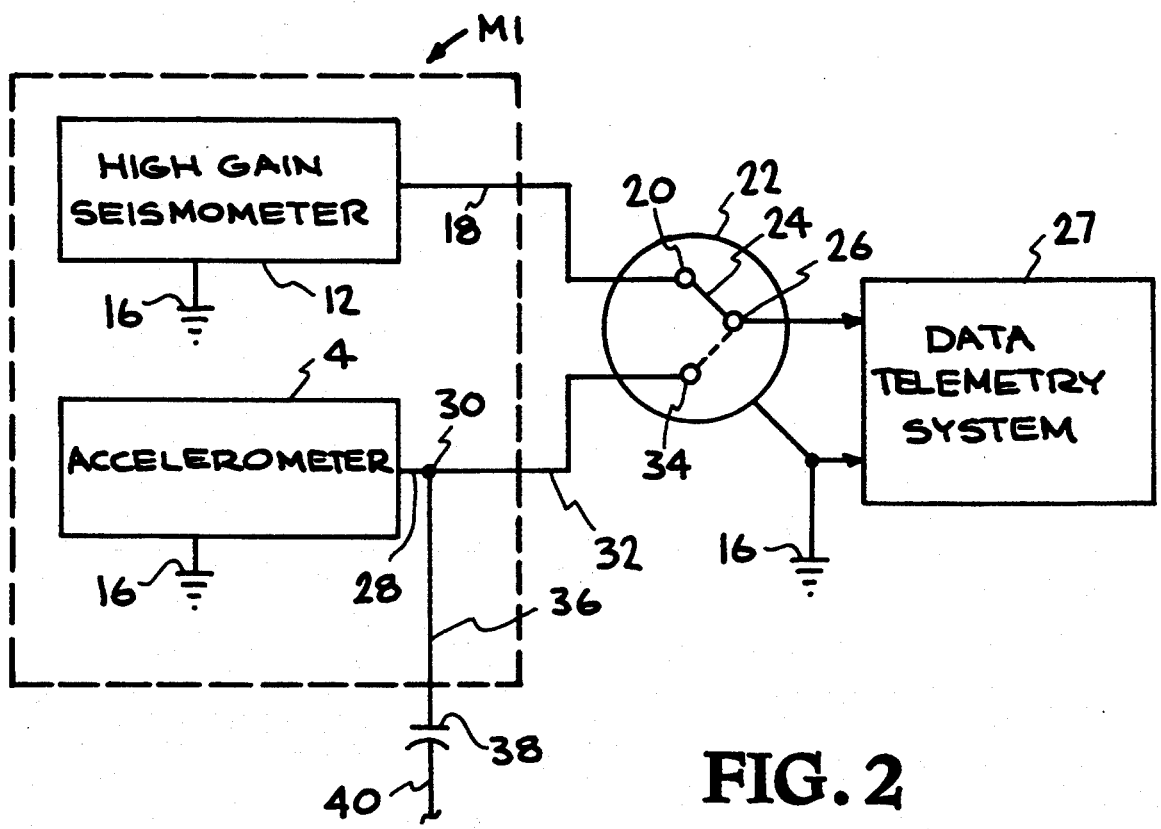
FIG. 2 shows the circuit which provides the signal input to the seismic switch of FIG. 1.

Module 1 (M1), as shown in FIG. 2, shows the circuit which provides the signal input to a data telemetry system located at an existing seismic station. M1 comprises high gain seismometer 12 and strong motion accelerometer 14. Seismometer 12 and accelerometer 14 are both connected to a common ground 16. Output signal 18 of seismometer 12 is fed to node 20 of signal switch 22. The signal is then fed through node 26 to a data telemetry system 27. Node 26 of switch 22 is referenced to common ground 16 and is normally closed such that nodes 20 and 26 are normally connected. An output signal 32 from accelerometer 14 is fed to point 30. When switch 22 activates, such that node 34 is connected to node 26, then the signal at point 30 passes to node 34, to node 26, and to the data telemetry system. Prior to activation of switch 22, the signal at point 30 is fed to the positive input of a polarized capacitor 38 (22 $\mu f$) which (along with resistor 44 in M2) forms a high pass filter having a corner frequency of 1.5 seconds. This filter eliminates DC offset from the strong motion instrument. The output from capacitor 38 is fed into module M2

Figure 3:
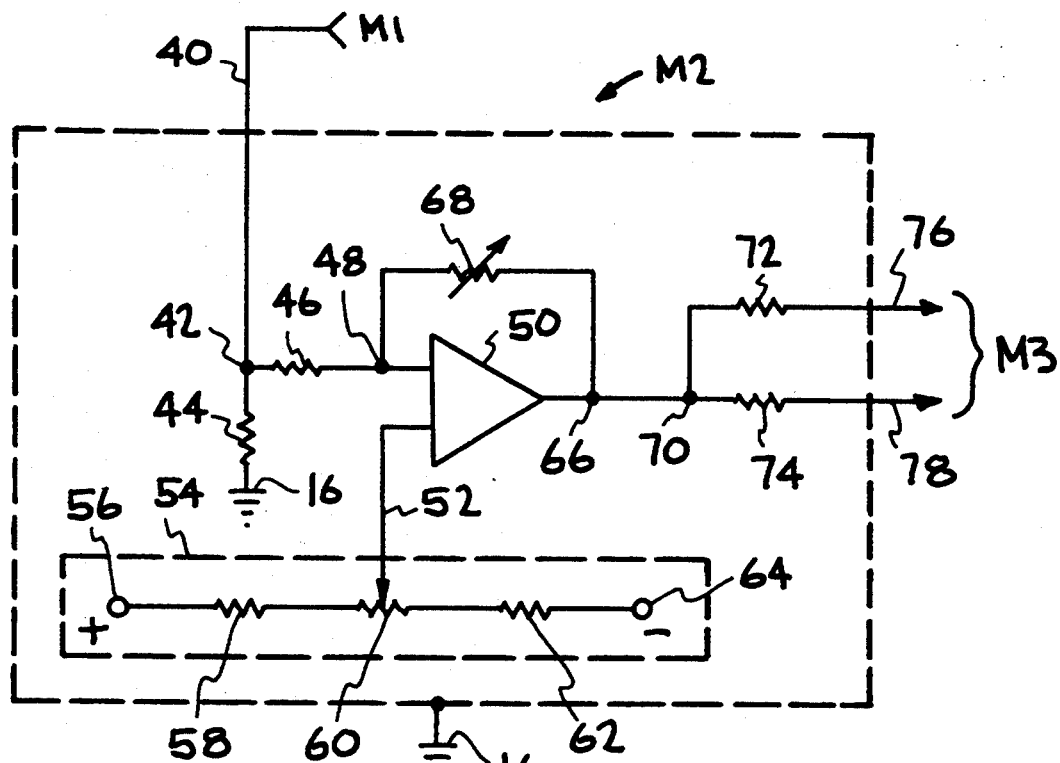
FIG. 3 shows the circuit which provides for amplification and input offset adjustment of FIG. 1.

Referring now to M2 as shown in FIG. 3, the signal present in lead 40 of M1 is fed to point 412, from which point a portion of the signal travels through resistor 44 (75 K$\Omega$) to common ground 16. A portion of the signal present at point 42 is fed through resistor 46 (10 K$\Omega$) and point 48, to an input of operational amplifier (OA) 50 (OP-207). Another input of OA 50 is connected by lead 52 to an offset adjustment 54 which comprises sequentially: a positive (+) 12 volt bias at node 56, a resistor 58 (26.1K$\Omega$), a variable resistor (VR) 60 (500 $\Omega$), a resistor 62 (26.1K$\Omega$) and a negative (−) 12 volt bias at point 64. The output signal from OA 50 is fed to point 66, from which a portion of the signal is fed back through a second variable resistor (VR) 68 (10K$\Omega$ to 1M$\Omega$) to point 48. The remaining signal at point 66 is fed to point 70 and then passes through two parallel resistors 72 (10K$\Omega$), and 74 (196K$\Omega$). The output from OA 50 passes through resistors 72 and 74, and along leads 76 and 78 respectively, to M3.

Figure 4:
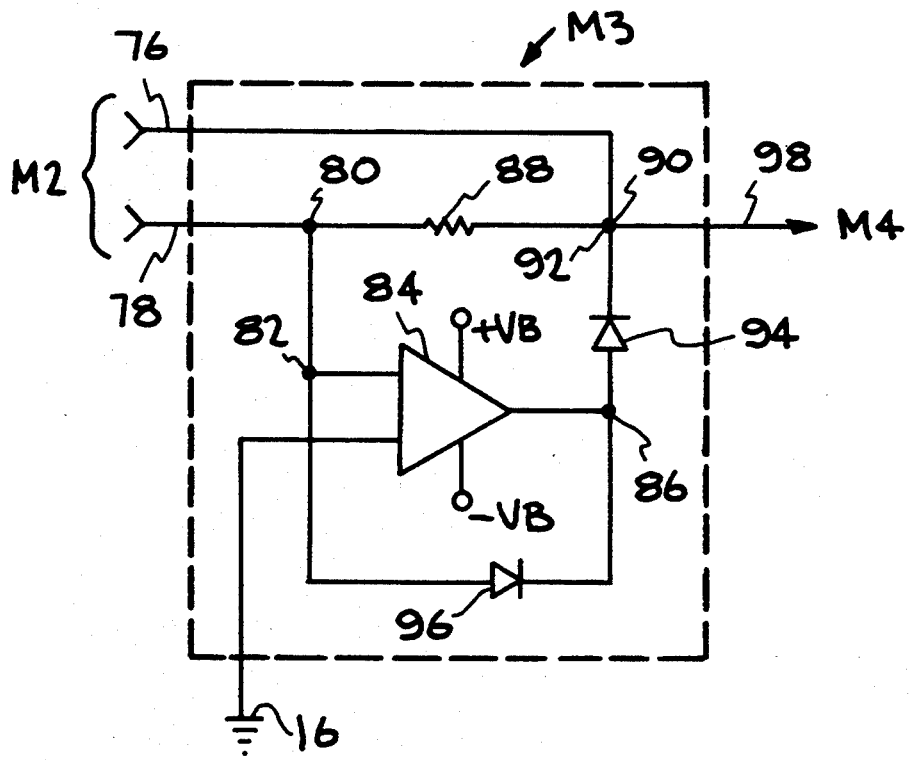
FIG. 4 shows the precision full wave rectifier of FIG. 1.

M3, as shown in FIG. 4, is a precision full-wave rectifier which converts AC to a positive DC level. Current passes through wire 78 to point 80, where some current is fed through point 82 into the negative input of operational amplifier (OA) 84 (OP-207). Some current is fed from point 80 into resistor 88 (10K$\Omega$) to point 90, where this current is summed with the current from wire 76. The summed current at point 90 is fed to point 92. Current flows from the output of OA 84 to point 86. A portion of the current at point 82 flows through diode 96, to sum with the OA output current at point 86. This summed current passes through diode 94 (1N4148) to point 92, summing with the currents therein present, to output through lead 98. A second input of OA 84 is connected to common ground 16. Pin 7 of OA 84 is positively biased at 12 volts with respect to common ground 16. Pin 5 of OA 84 is negatively biased at 12 volts with respect to common ground 16.

Figure 5:
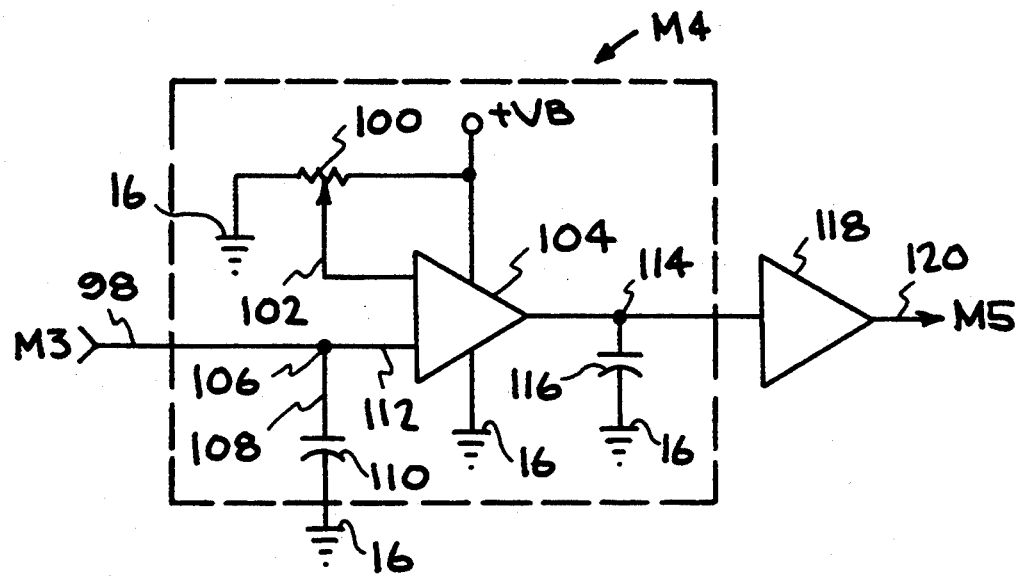
FIG. 5 shows the level detection circuit of FIG. 1.

Referring now to FIG. 5, M4 performs the level detect function of the circuit. A third variable resistor (VR) 100 (0 to 50K$\Omega$), is adjusted to a desired current level at which the circuit is to switch. Wiper 102 of VR 100 is connected to pin 2 of a third operational amplifier (OA) 104 (LM 324). Resistor 100 is common grounded at 16 and is connected to a positive (+) 5 volt bias. The current in lead 98 splits at point 106 with a portion of the signal going though lead 108 to capacitor 110 (0.01 $\mu f$), which is coupled to common ground 16. The remaining current passing though point 106 is fed through lead 112 into OA 104. OA 104 is grounded to 16. Part of the output of OA 104 goes to capacitor 116 (0.001 $\mu f$), which is coupled to common ground 16. The remainder of the current is input into buffer 118 (B118), and then out of B118 and into lead 120.

Figure 6:
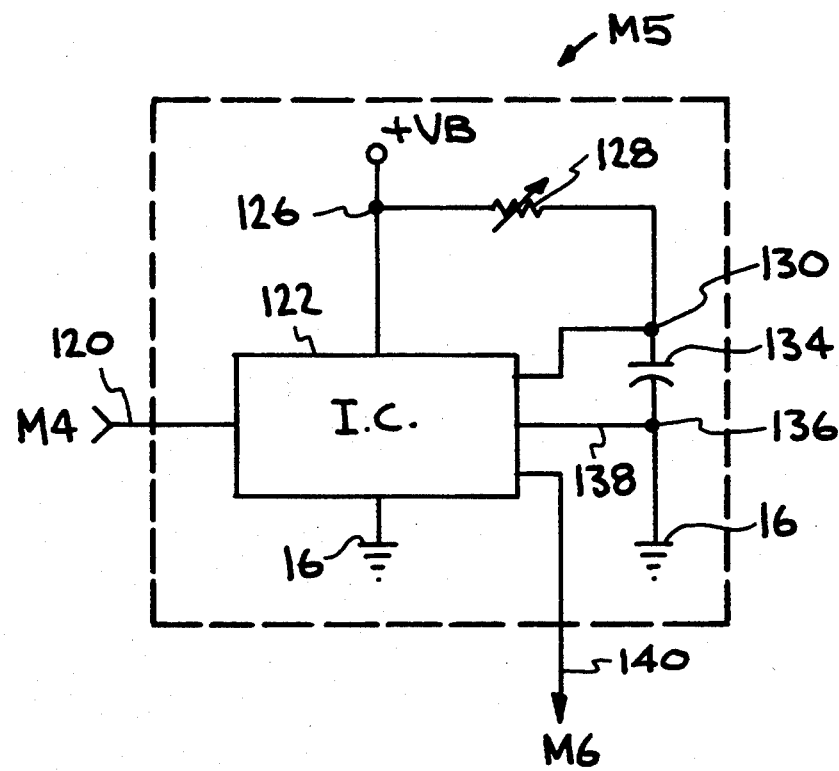
FIG. 6 shows the circuit of FIG. 1 that determines how long the seismic switch stays switched.

Lead 120, of M5, as shown in FIG. 6, provides current input to an integrated circuit (IC) 122 (74HC123), which is a timing circuit. IC 122 is positively biased at point 124 with 5 volts at pin 16 and pin 3. From point 126, the 5 volt bias is placed across a fourth variable resistor 128 (VR 128)(0 to 500K$\Omega$), which passes a current through point 130 and into pin 15 of IC 122. From point 130, current also passes through polarized capacitor 134 (100 $\mu f$). Point 130 is connected to the positive (+) lead of capacitor 134. The negative (−) lead of capacitor 134 is connected to common ground 16 through point 136. Point 136 is connected to pin 14 of IC122 through lead 138. Pin 1 and pin 8 of IC 122 are common grounded at 16. Current flows out of IC 122 at pin 13 into lead 140. Module 5 determines how long the seismic switch stays in the position where node 26 is connected to node 34. This time adjustment is set with variable resistor 128 (VR128).

Figure 7:
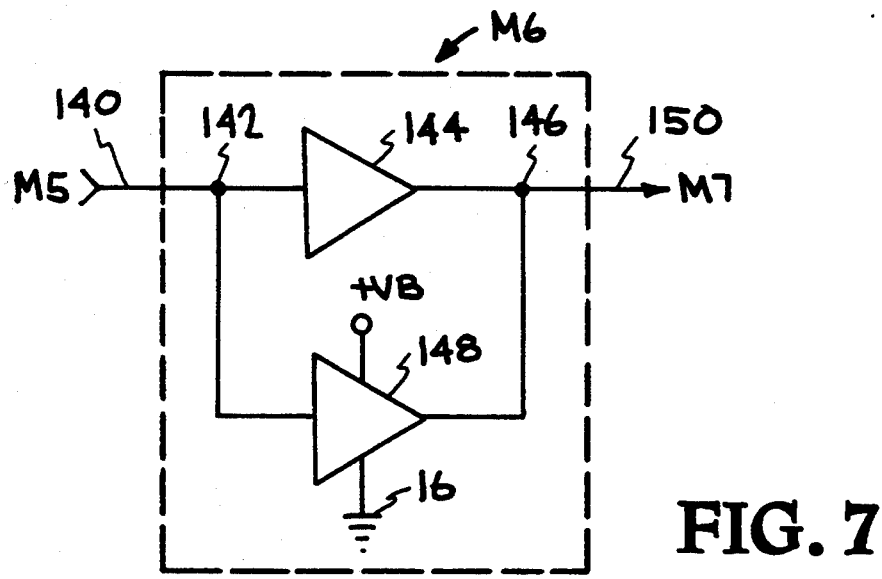
FIG. 7 shows the circuit of FIG. 1 that provides the current drive capacity needed to energize the relay.
Figure 8:
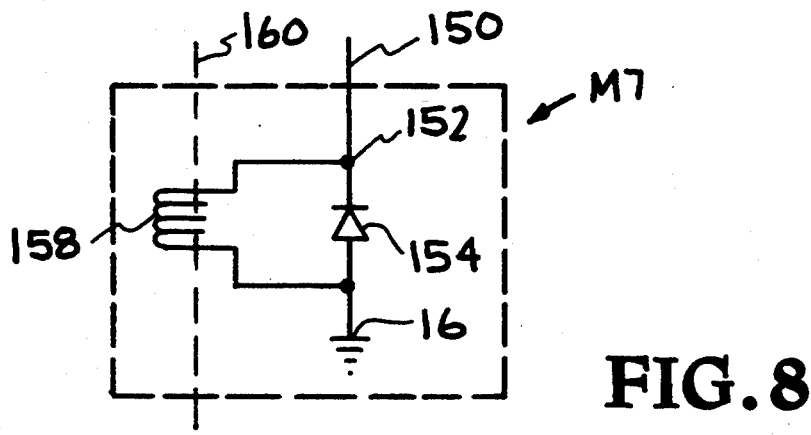
FIG. 8 shows the relay of FIG. 1 that switches the seismic switch from sensitive to strong motion output and back.

M6, as shown in FIG. 7, provides the current drive capacity needed to energize Relay 1 shown in FIG. 8. Current in lead 140 flows from point 142 partially into pin I of a first buffer 144 (B144)(U4) and out at pin 2, which is coupled to point 146. Current at point 142 also flows into pin 3 of a second buffer 148 (B148), which is biased at positive (+) 5 volts at pin 14 and common grounded to 16 from pin 7. Buffer 148 output from pin 4 is combined with buffer 144 output at point 146. This summed current is fed into lead 150.

Referring now to FIG. 8, M7 comprises Relay 1, which receives the current from lead 150. The current present at point 152 passes though coil 158, which surrounds plunger 160, which controls switch 22. Coil 158 is grounded at 16. M7 is the actual relay that switches the seismic switch from seismometer 12 to accelerometer 14 and back, as shown in FIG. 2.

Figure 9:
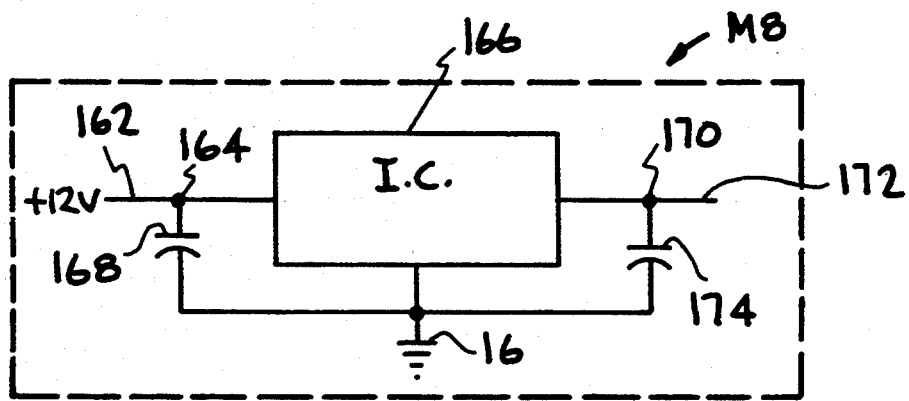
FIG. 9 shows the regulator needed to generate 5 V DC for several of the integrated circuits of FIG. 1.

M8, as shown in FIG. 9, is a 5 volt regulator which provides a positive (+) 5 V DC bias for OA 104, buffer 144, buffer 148, and IC 122. The 12 volts present in lead 162 is provided at existing seismic stations through the use of a 12 volt DC battery. This voltage is coupled to point 164 partially into integrated circuit (IC) 166 (7805 RG1) at pin 1, and partially to capacitor 168 (0.22 $\mu f$). IC 166 is grounded from pin 3 to ground 16. A 5 volt output from IC 166 at pin 2 is partially fed through point 170 into lead 172, and to the necessary circuits stated above. Point 170 is also coupled to capacitor 174 (0.1 $\mu f$).

Figure 10:
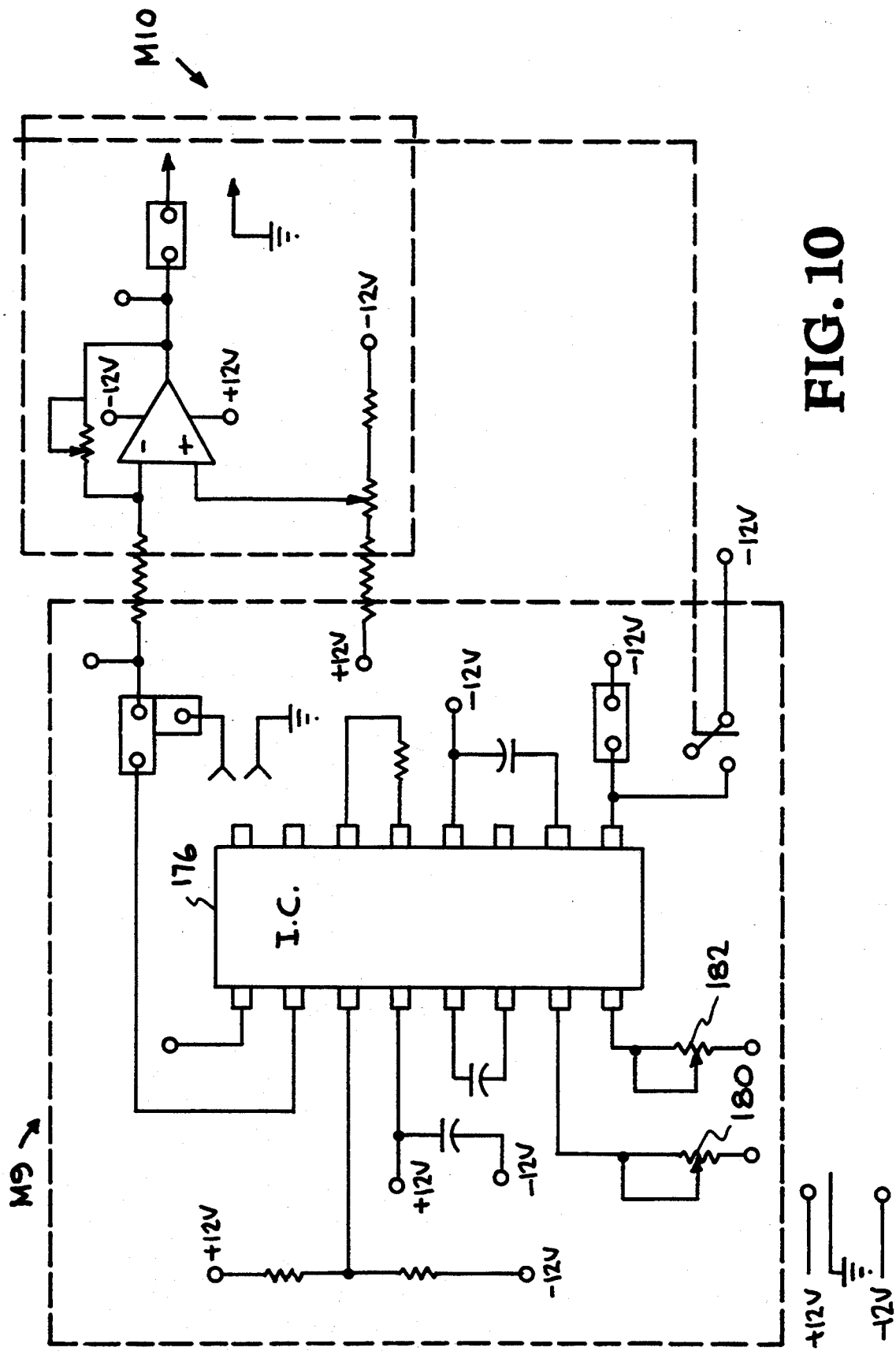
FIG. 10 shows the integrated circuits that generate and amplify two tones.

Another embodiment of the present invention comprises M1 through M8 as described above, and further comprises Module 9 (M9) and Module 10 (M10), both shown in FIG. 10. M9 is an integrated circuit that generates two tones. If the seismic switch has not been activated by strong motion, M9 sends out an alert tone at a particular frequency. This tone is generated at IC 176 (XR2206CN) from pin 2. Resistors 180 and 182 determine the alert tone frequencies. When the seismic switch has been activated, then M9 sends out a tone at a different frequency. This mode is activated by Relay 1 of M7 in the same manner as switch 22 shown in FIG. 2. M10 is the output amplifier for the tone generator and allows the user to adjust for any offset and to gain the tone signal, either up or down, to meet the input requirements of the summing amplifier that is part of the existing equipment at seismic station sites.

Figure 11:
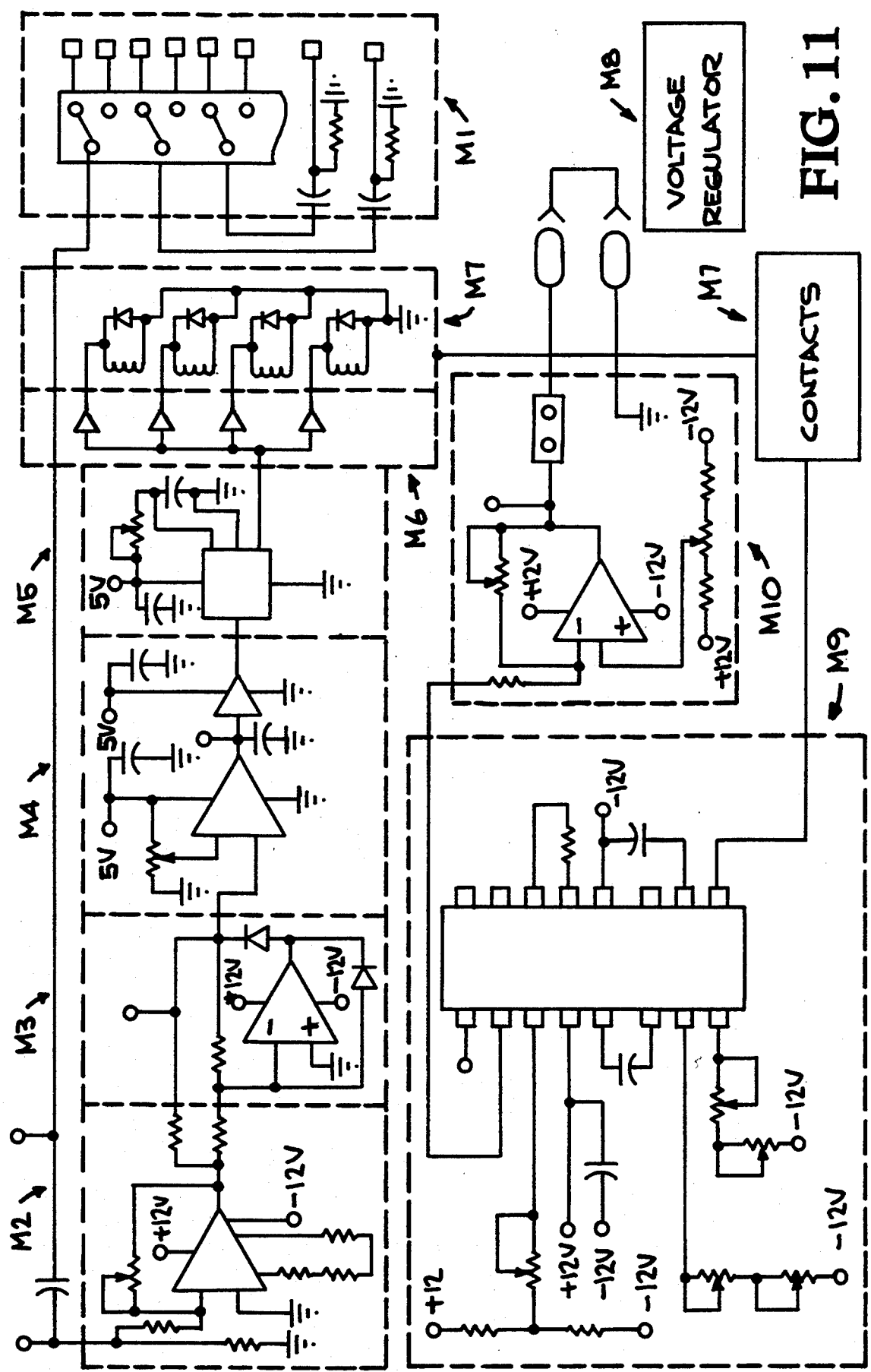
FIG. 11 shows a seismic switch comprising three sets of seismometers and strong motion accelerometers.

Still another embodiment of the present invention is a strong motion switch comprising three sets of seismometers and strong motion accelerometers. In this embodiment, M1, M6, and M7, as shown in FIG. 11, are modified to allow for three orthogonal component input seismometers and three orthogonal component input strong motion instruments. Only the vertical component strong motion instrument output signal is monitored, as in the original embodiment, to determine a switching condition. The modified M1 consists of a duplication of three of the preferred embodiment M1 modules, except that leads 36 and 40 occur on only one of the three M1 modules in the modified version. M6 requires the addition of two buffers, for a total of 4, or one per relay. M7 consists of three additional relays for a total of four. Each relay controls the switching of one component of the three seismometer/strong motion accelerometer sets. The fourth relay controls the switching of the tone generator (if present).

A method for using a seismic switch to measure ground motion involves connecting a switch between a seismometer and a data telemetry system. A ground motion accelerometer is then connected to the switch. Finally, the accelerometer and switch are connected to a circuit which will connect the accelerometer to the data telemetry system for a selectable period of time when a signal from the accelerometer exceeds a preset value.

Changes and modifications in the specifically described embodiments can be carried out without departing from the scope of the invention, which is intended to be limited by the scope of the appended claims.

We claim:

1. An apparatus for upgrading an existing microseismic station comprising:
    a switch;
    means for connecting said switch between a seismometer and a data telemetry system;
    a ground motion accelerometer;
    means for connecting said ground motion accelerometer to said switch; and
    a circuit which will connect said data telemetry system to said accelerometer when a signal from said accelerometer exceeds a preset value.

2. An apparatus for measuring seismic motion, said apparatus comprising;
    a switch having a first input channel and a second input channel and an output channel;
    a seismometer connected to a first input channel of said switch;
    an accelerometer connected to a second input channel of said switch;
    a data telemetry system connected to said output channel of said switch; and
    a circuit which monitors a signal from said accelerometer and transmits said signal from said accelerometer to said data telemetry system for a selectable period of time when said accelerometer signal exceeds a preset value.

3. The apparatus as recited in claim 2, wherein said seismometer measures ground motion with magnitudes less than 2 on the Richter scale.

4. The apparatus as recited in claim 2, wherein said accelerometer measures ground motion with magnitudes greater than 2 on the Richter scale.

5. The apparatus as recited in claim 2, wherein said data telemetry system comprises a system for recording a signal from said seismometer and said accelerometer.

6. The apparatus as recited in claim 2, wherein said circuit comprises means for monitoring said accelerometer signal.

7. The apparatus as recited in claim 2, wherein said circuit comprises means for amplifying said accelerometer signal.

8. The apparatus as recited in claim 2, wherein said circuit comprises means for rectifying an amplified signal from said accelerometer.

9. The apparatus as recited in claim 2, wherein said circuit comprises means for level detection of an amplified and rectified signal from said accelerometer.

10. The apparatus as recited in claim 2, wherein said circuit comprises means for preventing said seismometer signal from being recorded by said data telemetry system when said accelerometer signal exceeds a user set threshold.

11. The apparatus as recited in claim 2, wherein said circuit comprises means for causing said accelerometer signal to be recorded by said data telemetry system when said accelerometer signal exceeds a user set threshold.

12. The apparatus as recited in claim 2, wherein said circuit comprises means for determining how long said accelerometer signal is recorded by said data telemetry system.

13. An apparatus of claim 2 wherein said circuit comprises:
    means for monitoring said accelerometer signal;
    means for amplifying said accelerometer signal;
    means for rectifying an amplified signal from said accelerometer;
    means for level detection of an amplified and rectified signal from said accelerometer;
    means for preventing a signal from said seisometer from being recorded by said data telemetry system when said accelerometer signal exceeds a user set threshold; and
    means for determining how long said accelerometer signal is recorded by said data telemetry system 14. A method for upgrading an existing microseismic station to allow measurement of ground motion that is greater than 2 on the Richter scale, said method comprising the steps:
    providing a switch having a first input channel and a second input channel and an output channel, wherein said output channel is connected to a data telemetry system and wherein said output channel is normally connected to said first input channel;
    connecting a seismometer to said first input channel of said switch, wherein said seismometer is configured to measure ground motion having magnitudes less than 2 on the Richter scale;
    connecting an accelerometer to a second input channel of said switch, wherein said seismometer is configured to measure ground motion having magnitudes greater than 2 on the Richter scale; and
    connecting said accelerometer and said switch to a circuit which will connect said second input channel of said switch to said output channel of said switch for a selectable period of time when a signal from said accelerometer exceeds a preset value.

* * * * *